US011361672B2

(12) United States Patent
Gatzemeyer

(10) Patent No.: US 11,361,672 B2
(45) Date of Patent: Jun. 14, 2022

(54) ORAL CARE SYSTEM AND METHOD

(71) Applicant: COLGATE-PALMOLIVE COMPANY, New York, NY (US)

(72) Inventor: John Gatzemeyer, Hillsborough, NJ (US)

(73) Assignee: Colgate-Palmolive Company, New York, NY (US)

( * ) Notice: Subject to any disclaimer, the term of this patent is extended or adjusted under 35 U.S.C. 154(b) by 480 days.

(21) Appl. No.: 15/350,298

(22) Filed: Nov. 14, 2016

(65) Prior Publication Data

US 2018/0137774 A1 May 17, 2018

(51) Int. Cl.
*G09B 19/00* (2006.01)
*A46B 15/00* (2006.01)
*A46B 9/04* (2006.01)
*A61C 17/22* (2006.01)

(52) U.S. Cl.
CPC ........... *G09B 19/0084* (2013.01); *A46B 9/04* (2013.01); *A46B 15/00* (2013.01); *A46B 15/0002* (2013.01); *A46B 15/0004* (2013.01); *A46B 15/0006* (2013.01); *A46B 15/0008* (2013.01); *A46B 15/0012* (2013.01); *A61C 17/22* (2013.01); *A46B 2200/1066* (2013.01)

(58) Field of Classification Search
None
See application file for complete search history.

(56) References Cited

U.S. PATENT DOCUMENTS

| 4,253,212 | A | * | 3/1981 | Fujita | A46B 15/0002 |
| | | | | | 15/167.1 |
| 5,383,244 | A | * | 1/1995 | Ahrens | A46B 5/0008 |
| | | | | | 15/106 |
| 5,815,872 | A | | 10/1998 | Meginniss, III et al. | |
| 5,876,207 | A | | 3/1999 | Sundius et al. | |
| 5,894,620 | A | | 4/1999 | Polaert et al. | |
| 5,930,858 | A | | 8/1999 | Jung | |
| 6,314,907 | B1 | | 11/2001 | Harris et al. | |
| 6,326,884 | B1 | | 12/2001 | Wohlrabe | |
| 6,327,734 | B1 | | 12/2001 | Meginniss, III et al. | |
| 6,425,295 | B1 | | 7/2002 | Meginnis | |
| 6,453,497 | B1 | | 9/2002 | Chiang et al. | |
| 6,468,076 | B2 | | 10/2002 | Kawamura | |
| 6,536,068 | B1 | | 3/2003 | Yang et al. | |

(Continued)

FOREIGN PATENT DOCUMENTS

| AU | 2001252198 A1 | 9/2002 |
| CN | 202270341 | 6/2012 |

(Continued)

OTHER PUBLICATIONS

International Search Report and Written Opinion of the International Searching Authority in International Application No. PCT/US2017/061321, dated Feb. 27, 2018.

*Primary Examiner* — Thomas J Hong
*Assistant Examiner* — Sadaruz Zaman

(57) ABSTRACT

In one embodiment, the invention can be an oral care system that includes a toothbrush; a programmable processor configured to receive oral characteristic data indicative of an oral characteristic of a user; and determine for the user, based at least in part on the oral characteristic data, at least one of a suggested brushing routine and a brushing evaluation for a brushing session.

15 Claims, 11 Drawing Sheets

(56) References Cited

U.S. PATENT DOCUMENTS

| | | |
|---|---|---|
| 6,611,780 B2 | 8/2003 | Lundell et al. |
| 6,630,730 B2 | 10/2003 | Grigg |
| 6,685,471 B1 | 2/2004 | Kawamura et al. |
| 6,735,802 B1 | 5/2004 | Lundell et al. |
| 6,739,012 B2 | 5/2004 | Grez et al. |
| 6,786,732 B2 | 9/2004 | Savill et al. |
| 7,120,960 B2 | 10/2006 | Kilscher et al. |
| 7,264,026 B2 | 9/2007 | Gruber et al. |
| 7,411,511 B2 | 8/2008 | Kennish et al. |
| 7,682,153 B2 | 3/2010 | Hilfinger et al. |
| 7,748,069 B2 | 7/2010 | Dawley |
| 7,774,886 B2 | 8/2010 | Hilscher et al. |
| 7,976,388 B2 | 7/2011 | Park et al. |
| 8,065,164 B2 | 11/2011 | Hwang |
| 8,075,316 B2 * | 12/2011 | Krause ............... G09B 19/0084 446/268 |
| 8,161,792 B2 | 4/2012 | Schlueter et al. |
| 8,171,591 B2 | 5/2012 | Hall et al. |
| 8,172,574 B2 | 5/2012 | Hilfinger et al. |
| 8,175,840 B2 | 5/2012 | Hwang et al. |
| 8,214,958 B2 | 7/2012 | Pinyayev et al. |
| 8,218,711 B2 | 7/2012 | Neyer |
| 8,256,979 B2 | 9/2012 | Hilscher et al. |
| 8,272,091 B2 | 9/2012 | Hwang et al. |
| 8,296,686 B1 * | 10/2012 | Tedesco ............... G16H 40/63 715/865 |
| 8,332,186 B2 | 12/2012 | Bates et al. |
| 8,337,213 B2 | 12/2012 | Puurunen et al. |
| 8,381,571 B2 | 2/2013 | Wilhelm et al. |
| 8,393,037 B2 | 3/2013 | Iwahori et al. |
| 8,444,416 B2 | 5/2013 | Chenvainu et al. |
| 8,544,131 B2 | 10/2013 | Braun et al. |
| 8,595,882 B2 | 12/2013 | Bax et al. |
| 8,690,579 B2 | 4/2014 | Ikkink et al. |
| 8,744,192 B2 | 6/2014 | Ortins et al. |
| 8,769,758 B2 | 7/2014 | Jungnickel et al. |
| 8,789,227 B2 | 7/2014 | Cook et al. |
| 8,801,763 B2 | 8/2014 | Fish et al. |
| 8,832,895 B2 | 9/2014 | Jungnickel et al. |
| 8,839,476 B2 | 9/2014 | Adachi |
| 8,863,343 B2 | 10/2014 | Iwahori |
| 8,938,839 B2 | 1/2015 | Kitagawa et al. |
| 8,944,813 B2 | 2/2015 | Kotlarchik |
| 8,972,882 B2 | 3/2015 | Berry |
| 9,009,901 B2 | 4/2015 | Doll et al. |
| 9,105,197 B2 | 8/2015 | Meriheinae et al. |
| 9,113,700 B2 | 8/2015 | Bates et al. |
| 9,192,762 B2 | 11/2015 | Doll et al. |
| 9,204,947 B2 | 12/2015 | Bovenkamp et al. |
| 9,223,903 B2 | 12/2015 | Lamb et al. |
| 9,259,302 B2 | 2/2016 | Miller |
| 9,326,594 B2 | 5/2016 | De Vries et al. |
| 9,333,048 B2 | 5/2016 | Li et al. |
| 9,345,408 B2 | 5/2016 | Curry et al. |
| 11,043,141 B2 * | 6/2021 | Gatzemeyer ....... A46B 15/0008 |
| 2002/0096607 A1 * | 7/2002 | Strunk ............... G09B 19/0084 248/111 |
| 2002/0119432 A1 * | 8/2002 | Ranta .................... G09B 23/28 434/263 |
| 2003/0115694 A1 | 6/2003 | Pace |
| 2005/0136384 A1 * | 6/2005 | Jarvis ............... G09B 19/0084 434/263 |
| 2006/0008787 A1 * | 1/2006 | Hayman ............ H05B 41/2855 434/263 |
| 2006/0040246 A1 | 2/2006 | Ding et al. |
| 2006/0123570 A1 | 6/2006 | Pace et al. |
| 2006/0281042 A1 * | 12/2006 | Rizoiu .................. A61C 17/22 433/29 |
| 2007/0027386 A1 | 2/2007 | Such et al. |
| 2007/0065792 A1 * | 3/2007 | Schubarth ............ G09B 23/283 434/263 |
| 2007/0105063 A1 | 5/2007 | Pinyayev et al. |
| 2007/0261185 A1 | 11/2007 | Guney et al. |
| 2008/0028553 A1 * | 2/2008 | Batthauer .......... A46B 15/0042 15/105 |
| 2008/0109973 A1 * | 5/2008 | Farrell ............... A46B 15/0044 15/4 |
| 2008/0256725 A1 | 10/2008 | Emge |
| 2008/0295760 A1 | 12/2008 | Wielstra |
| 2009/0007433 A1 | 1/2009 | Hawes et al. |
| 2009/0038639 A1 | 2/2009 | Yetukuri et al. |
| 2009/0070949 A1 | 3/2009 | Sagel et al. |
| 2009/0215015 A1 | 8/2009 | Chu |
| 2009/0241278 A1 | 10/2009 | Lemchen |
| 2009/0271936 A1 | 11/2009 | Walanski et al. |
| 2010/0024143 A1 | 2/2010 | Dickie |
| 2010/0178252 A1 | 7/2010 | Sagel et al. |
| 2010/0269276 A1 | 10/2010 | Faranda et al. |
| 2010/0281636 A1 | 11/2010 | Ortins et al. |
| 2010/0309302 A1 | 12/2010 | Yang |
| 2010/0319145 A1 | 12/2010 | Neyer et al. |
| 2010/0323337 A1 * | 12/2010 | Ikkink ................ A46B 15/0002 434/263 |
| 2011/0045778 A1 | 2/2011 | Stratmann et al. |
| 2011/0076638 A1 | 3/2011 | Gottenbos et al. |
| 2011/0081628 A1 | 4/2011 | Alden et al. |
| 2011/0229842 A1 | 9/2011 | Bielfeldt et al. |
| 2011/0247154 A1 | 10/2011 | Driesen et al. |
| 2011/0275424 A1 | 11/2011 | Schmid et al. |
| 2011/0294096 A1 | 12/2011 | deCastro et al. |
| 2012/0005898 A1 | 1/2012 | Molema et al. |
| 2012/0151697 A1 | 6/2012 | Farrell et al. |
| 2012/0171657 A1 * | 7/2012 | Ortins ................ A46B 15/0042 434/365 |
| 2012/0246846 A1 | 10/2012 | Hall |
| 2012/0295216 A1 | 11/2012 | Dykes et al. |
| 2013/0080295 A1 | 3/2013 | Dykes et al. |
| 2013/0091642 A1 | 4/2013 | Dykes et al. |
| 2013/0125326 A1 | 5/2013 | Schmid et al. |
| 2013/0125327 A1 | 5/2013 | Schmid et al. |
| 2013/0166220 A1 | 6/2013 | Bates et al. |
| 2013/0177863 A1 * | 7/2013 | Shreve ............... A46B 15/0002 433/27 |
| 2013/0180061 A1 | 7/2013 | Simeth et al. |
| 2013/0188112 A1 | 7/2013 | Vetter |
| 2013/0203008 A1 | 8/2013 | Kressman et al. |
| 2013/0204597 A1 | 8/2013 | Depta et al. |
| 2013/0207575 A1 | 8/2013 | Bax et al. |
| 2014/0022061 A1 | 1/2014 | Apte et al. |
| 2014/0022798 A1 | 1/2014 | Yang |
| 2014/0022917 A1 | 1/2014 | Apte et al. |
| 2014/0022939 A1 | 1/2014 | Apte et al. |
| 2014/0022941 A1 | 1/2014 | Apte et al. |
| 2014/0023060 A1 | 1/2014 | Apte et al. |
| 2014/0033034 A1 | 1/2014 | Patel |
| 2014/0065588 A1 * | 3/2014 | Jacobson ............... A46B 17/08 434/263 |
| 2014/0090197 A1 | 4/2014 | Bernhard et al. |
| 2014/0091001 A1 | 4/2014 | Chan et al. |
| 2014/0096331 A1 | 4/2014 | Farrell et al. |
| 2014/0246049 A1 | 9/2014 | Ikkink et al. |
| 2014/0250612 A1 | 9/2014 | Curry et al. |
| 2014/0310900 A1 | 10/2014 | Curry et al. |
| 2014/0324226 A1 | 10/2014 | Cook et al. |
| 2015/0044629 A1 | 2/2015 | Wang et al. |
| 2015/0088538 A1 | 3/2015 | Dykes et al. |
| 2015/0113747 A1 | 4/2015 | May et al. |
| 2015/0134369 A1 | 5/2015 | Sakata et al. |
| 2015/0141774 A1 | 5/2015 | Ogawa et al. |
| 2015/0157122 A1 | 6/2015 | Prescott |
| 2015/0202030 A1 | 7/2015 | Miller |
| 2015/0205279 A1 | 7/2015 | Simeth |
| 2015/0230593 A1 | 8/2015 | Doll et al. |
| 2015/0230898 A1 | 8/2015 | Miller |
| 2015/0230899 A1 | 8/2015 | Vetter et al. |
| 2015/0244773 A1 | 8/2015 | Wang et al. |
| 2015/0297085 A1 | 10/2015 | Simons et al. |
| 2015/0297089 A1 | 10/2015 | Deane et al. |
| 2015/0305626 A1 | 10/2015 | Deane et al. |
| 2015/0305670 A1 | 10/2015 | Spruit et al. |
| 2015/0313353 A1 | 11/2015 | Schmalhurst et al. |
| 2015/0320531 A1 | 11/2015 | Van Gool et al. |

(56) References Cited

U.S. PATENT DOCUMENTS

| | | |
|---|---|---|
| 2015/0330966 A1 | 11/2015 | Drake et al. |
| 2015/0351883 A1 | 12/2015 | Hwang et al. |
| 2015/0381096 A1 | 12/2015 | Klemm et al. |
| 2016/0015492 A1 | 1/2016 | Skaanland et al. |
| 2016/0022024 A1 | 1/2016 | Vetter et al. |
| 2016/0022393 A1 | 1/2016 | Yoshida et al. |
| 2016/0022398 A1 | 1/2016 | Vetter et al. |
| 2016/0143718 A1 | 5/2016 | Serval et al. |
| 2016/0235357 A1 | 8/2016 | Ohmer et al. |
| 2016/0242652 A1 | 8/2016 | Van Putten et al. |
| 2016/0270666 A1 | 9/2016 | Vermeulen |
| 2016/0296163 A1 | 10/2016 | Chaudhry et al. |
| 2016/0310248 A1 | 10/2016 | Meerbeek et al. |
| 2016/0317267 A1 | 11/2016 | Meerbeek et al. |
| 2016/0338635 A1 | 11/2016 | Johnson et al. |
| 2016/0343270 A1 | 11/2016 | Zheng et al. |
| 2017/0116665 A1* | 4/2017 | Alzahrani ............ A61B 5/4547 |
| 2017/0303673 A1* | 10/2017 | Van Gool ............ A61B 5/6898 |
| 2018/0137774 A1* | 5/2018 | Gatzemeyer ............ A46B 9/04 |

FOREIGN PATENT DOCUMENTS

| | | |
|---|---|---|
| CN | 204393684 U | 6/2015 |
| CN | 204393685 U | 6/2015 |
| CN | 105744911 | 7/2016 |
| DE | 10224043 A1 | 12/2003 |
| DE | 10255722 A1 | 6/2004 |
| DE | 102013015537 | 12/2014 |
| IN | 234961 B | 1/2007 |
| IN | 200601965 P1 | 8/2007 |
| IN | 200804686 P1 | 8/2008 |
| IN | 201204976 P4 | 10/2013 |
| IN | 201306137 P1 | 12/2014 |
| JP | 2001327331 A | 11/2001 |
| JP | 2002181812 A | 6/2002 |
| JP | 2003093416 A | 4/2003 |
| JP | 2006235809 A | 9/2006 |
| JP | 2010172384 A | 8/2010 |
| JP | 04543663 B2 | 9/2010 |
| JP | 2012086022 A | 5/2012 |
| JP | 2014023796 A | 2/2014 |
| KR | 20070103055 A | 10/2007 |
| RU | 2388430 C2 | 4/2009 |
| WO | WO 99/47020 A1 | 9/1999 |
| WO | WO 2008/058817 A1 | 5/2008 |
| WO | WO 2008/060482 A3 | 5/2008 |
| WO | WO 2008/147360 A1 | 12/2008 |
| WO | WO 2009/001295 A1 | 12/2008 |
| WO | WO 2010/134049 A1 | 11/2010 |
| WO | WO 2010/134051 A1 | 11/2010 |
| WO | WO 2012/042493 A1 | 4/2012 |
| WO | WO 2013/084403 A1 | 6/2013 |
| WO | WO 2014/016718 A1 | 1/2014 |
| WO | WO 2014/097022 A1 | 6/2014 |
| WO | WO 2014/097135 A1 | 6/2014 |
| WO | WO 2014/097240 A3 | 6/2014 |
| WO | WO 2015/003939 A1 | 1/2015 |
| WO | WO 2015/092125 A1 | 6/2015 |
| WO | WO 2015/092626 A1 | 6/2015 |
| WO | WO 2015/140340 A1 | 9/2015 |
| WO | WO 2015/177661 A1 | 9/2015 |
| WO | WO 2016/016323 A1 | 2/2016 |
| WO | WO 2016/020780 A1 | 2/2016 |
| WO | WO 2016/020803 A1 | 2/2016 |
| WO | WO 2016/046701 A1 | 3/2016 |
| WO | WO 2016/047793 A1 | 3/2016 |
| WO | 2016/097907 | 6/2016 |

* cited by examiner

ORAL CARE SYSTEM AND METHOD

BACKGROUND

To improve oral care, an oral care system may provide a suggested brushing routine. In other approaches, an oral care system may utilize one or more sensors to evaluate the effectiveness of a brushing session. These approaches for improving oral care, however, do not consider that different users may have different oral characteristics. For example, a user may have oral sensitivity in a certain area of the mouth that affects the user's ability to brush teeth in this area. There is need for a method of determining a brushing routine and/or evaluating a brushing session that considers each user's unique oral characteristics.

BRIEF SUMMARY

The present disclosure may be directed, in one aspect, to an oral care system including a toothbrush; a programmable processor configured to receive oral characteristic data indicative of an oral characteristic of a user; and determine for the user, based at least in part on the oral characteristic data, at least one of a suggested brushing routine and a brushing evaluation for a brushing session.

In another aspect, an oral care method includes receiving, by a programmable processor, oral characteristic data indicative of an oral characteristic of a user; and determining for the user, by the programmable processor, based at least in part on the oral characteristic data, at least one of a suggested brushing routine and a brushing evaluation for a brushing session.

In yet another aspect, an oral care system includes a toothbrush; and a data processing unit comprising a user interface configured to receive an oral characteristic from a user; and a programmable processor configured to receive oral characteristic data indicative of the oral characteristic received by the user interface; determine for the user, based at least in part on the oral characteristic data, a suggested brushing routine; and determine for the user, based at least in part on the oral characteristic data, a brushing evaluation for a brushing session.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION

Figure 1A:
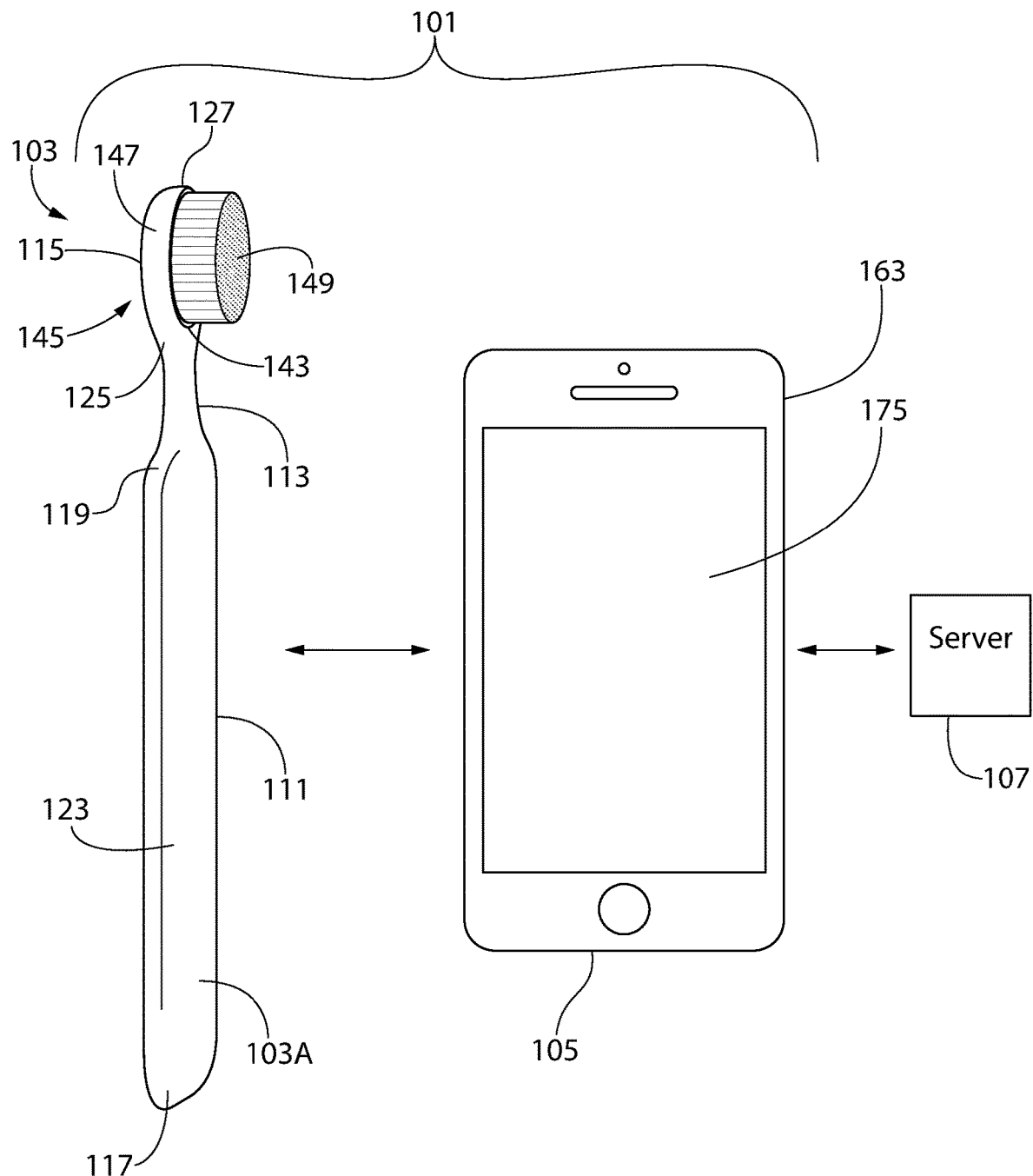
FIG. 1A illustrates an oral care system according to an embodiment of the present invention.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Turning in detail to the drawings, FIG. 1A illustrates an oral care system 101 in accordance with an embodiment of the present invention. The oral care system 101 includes a toothbrush 103 and a data processing unit 105. The data processing unit 105 may communicate with a server 107, for example, for purposes of storing larger amounts of data or to provide server-side processing functionality. The presence of the server 107 and communication between the data processing unit 105 and the server 107, however, are not limiting of the present invention, unless specifically set forth in a claim.

The toothbrush 103 may be of any type that includes teeth cleaning elements suitable for cleaning teeth, and therefore is not limited to the toothbrush 103 illustrated as part of the exemplary embodiment. The toothbrush 103 shown in FIG. 1A generally includes a handle 111, a neck 113, and a head 115. The neck 113 extends between the handle 111 and the head 115 and connects the head 115 to the handle 111. The handle 111 provides the user with a mechanism by which the toothbrush 103 can be readily gripped and manipulated during a brushing session. The handle 111 may be formed of many different shapes, sizes and materials and may be formed by a variety of manufacturing methods that are well-known to those skilled in the art. The handle 111 extends from a proximal end 117 to a distal end 119 to form an elongated gripping portion 123 therebetween. The handle 111 transitions into the neck 113 at the distal end 119. While the neck 113 generally has a smaller transverse cross-sectional area than the handle 111, the invention is not so limited. Broadly speaking, the neck 113 forms a transition region between the handle 111 and the head 115, with the head 115 extending from a proximal end 125 at the end of the neck 113 opposite the handle 111 to a distal end 127. While the head 115 is normally widened relative to the neck 113, in some embodiments the head 115 can simply be a continuous extension or narrowing of the neck 113 and/or handle 111.

The handle 111, the neck 113, and the head 115 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. However, in other embodiments, the handle 111, the neck 113, and the head 115 of the toothbrush 103 may be formed as a single unitary structure using a molding, milling, machining, or other suitable process. In certain embodiments, the neck 113 may be made from a material which is more flexible than the handle 111 or the head 115, and in such embodiments, the flexibility of the neck 113 provides the head 115 with mobility with respect to the handle 111. Whether the handle 111, the neck 113, and the head 115 are of a unitary or multi-piece construction (including connection techniques) is not limiting of the present invention, unless specifically set forth in a claim. In some embodiments of the invention, the head 115 can have a first portion that is flexibly attached to a second portion of the head 115. During brushing, the first portion can move with respect to the second portion to enhance the brush head's ability to reach certain portions of the dentiture of the user (the dentiture being understood as the user's set of teeth). In some embodiments of the invention, the head 115 may be detachable (and replaceable) from the handle 111 and/or from the neck 113 using techniques known in the art.

The head 115 generally includes a front surface 143, a rear surface 145 and peripheral side surfaces 147 that extend between the front and rear surfaces 143, 145. The front surface 143 and the rear surface 145 of the head 115 can take on a wide variety of shapes and contours, none of which are limiting of the present invention. For example, the front and rear surfaces 143, 145 can be planar, contoured or combinations thereof.

The front surface 143 of the head 115 includes at least one teeth cleaning element, shown in the exemplary embodiment as a plurality of bristles 149, extending therefrom for cleaning teeth surfaces. As used herein, the term "teeth cleaning element" is used in a generic sense to refer to any structure that can be used to clean or polish the teeth through relative surface contact. In certain embodiments, the head 115 may include a single teeth cleaning element, and in other embodiments, the head 115 may include two or more teeth cleaning elements. Common examples of the at least one teeth cleaning element include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the at least one teeth cleaning element may be an elastomeric material having a hardness property in the range of A8 to A25 Shore hardness. Other materials within and outside the noted hardness range may also be used.

The bristles 149 of the toothbrush 111 can be connected to the head 115 in any manner known in the art. For example, staples/anchors, in-mold tufting (IMT) or anchor free tufting (AFT) could be used to mount the bristles 149 of the exemplary embodiment. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Alternatively, the bristles may be mounted to tuft blocks or sections by extending through suitable openings in the tuft blocks so that the base of the bristles are mounted within or below the tuft blocks.

Figure 1B:
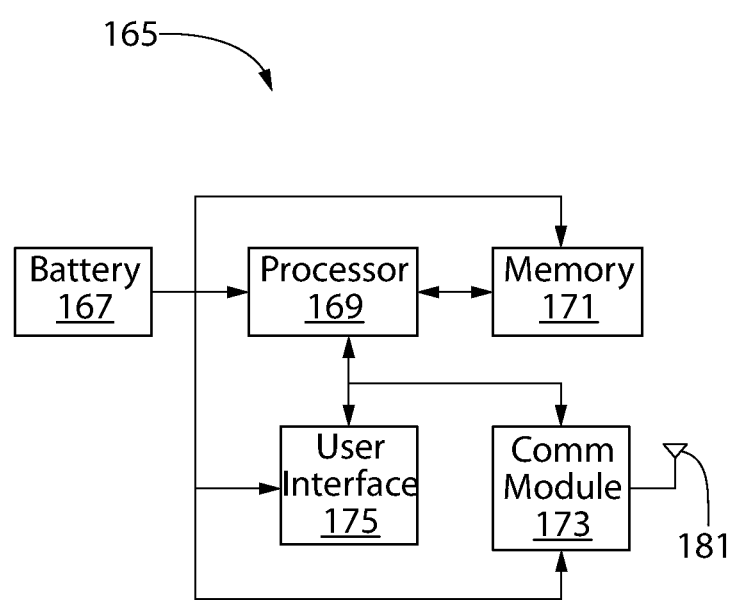
FIG. 1B is a schematic of the electronic circuitry of the data processing unit of FIG. 1A.

Referring to both FIGS. 1A and 1B, the data processing unit 105 includes a housing 163 and electronic circuitry 165, with the housing 163 enclosing and/or supporting the various components of the electronic circuitry 165. The electronic circuitry 165 includes a power source, shown as a battery 167 in the exemplary embodiment. The invention is not so limited, and other types of power sources may be used. The electronic circuitry 165 of the data processing unit 105 also includes a processor 169 communicably coupled to a memory 171, a communication module 173, and a user interface 175.

In certain embodiments, the electronic circuitry 165 may include other components, such as a speaker to provide audible feedback to the user, one or more buttons to receive input from the user, and one or more ports for making a wired connection between the electronic circuitry 165 and other circuitry external to the data processing unit 105. In certain other embodiments, the data processing unit 105 may be a smartphone, a tablet computer, a laptop computer, and the like, although the invention is not so limiting. In the exemplified embodiment, the electronic circuitry 165 is located within housing 163 of the data processing unit 105, this housing 163 being separate and distinct from the housing 103A of the toothbrush 103 In other embodiments, such as that discussed below with respect to FIG. 4, the electronic circuitry 165 or certain components thereof may be located within the housing 103A of the toothbrush 103.

The memory 171 may be any appropriate type of memory or storage which enables the processor 169 to perform the desired programming, such as volatile and/or non-volatile random access memory. The particular type of storage used for the memory 171 is not to be limiting of the invention.

In the exemplified embodiment, the user interface 175 is a touch-sensitive display which accepts input from the user directly on the display surface. The display may be any type of light emitting display, and as shown in the exemplary embodiment, the display may be an LED panel. In certain other embodiments, the display may be an LCD panel, an OLED panel, or any other type of display which is electronically controllable by the programmable processor 169 to provide visual feedback to the user. As will be discussed below, the user interface is not limited to the exemplary embodiment, but can comprise any device or method by which a user interacts with the data processing unit or a programmable processor. For example, in other embodiments the user interface can utilize a non-touch-sensitive graphical user interface, buttons, a dial, a keyboard, and/or a mouse. In other embodiments, a user interface can be omitted. For example, instead of receiving an oral characteristic by a user interface, oral characteristic data can be received from, or based on, data from a sensor that forms part of a brush.

The communication module 173 may include an antenna 181 to enable wireless transmission of communication signals. The communication module 173 may be configured and/or programmed to communicate using a wireless technology standard such as Wi-Fi, Bluetooth®, and the like, or it may communicate using any type of proprietary wireless transmission protocol. The mode of communication for which the communication module 173 is configured is not limiting of the invention unless specifically set forth in a claim. In certain embodiments, the communication module 173 may include a port to enable communications using wires and wired protocols, such as USB and the like.

The communication module 173 of the data processing unit 105 may be configured and/or programmed to communicate with the server 107. The communication module 173 may communicate with the server 107 over any combination of public and/or private network, and the communications may be wired, wireless, or a combination of the two. In certain embodiments, the communication module 173 may communicate with the server 107 over the Internet using one or more types of communication protocols. In certain embodiments, the server 107 may be programmed with one or more application programming interfaces (APIs) which provides server-side functionality to the data processing unit 105. The communication module 173 may also be configured to communicate with the toothbrush 103, for example, in the receipt from the toothbrush 103 of data related to a brushing session.

Figure 2:
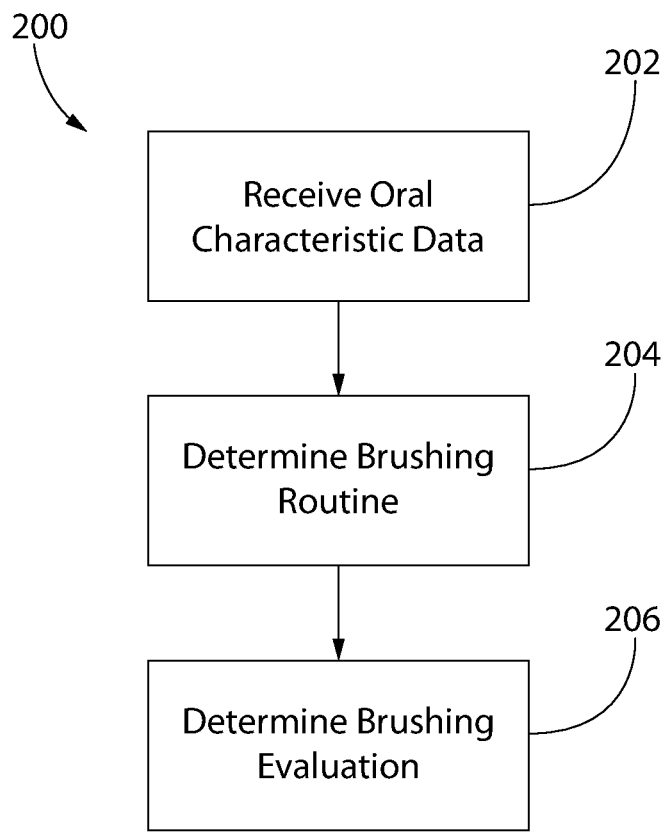
FIG. 2 is a flowchart showing a process for determining a brushing routine and a brushing evaluation based on oral characteristic data according to an embodiment of the invention.

FIG. 2 is a flowchart showing a process 200 for determining a brushing routine and a brushing evaluation from an oral characteristic according to an embodiment of the invention. In one embodiment, the exemplified process 200 may be implemented as programming for the programmable processor 169 of the data processing unit 105. For convenience, as part of the description below, reference will also be made to the hardware components of the data processing unit 105 discussed above in FIG. 1B, and means for obtaining brushing session data discussed with respect to FIGS. 8-10. While in the exemplified embodiment the processor 169 and other electronic circuitry 165 form part of the data processing unit, the disclosure is not so limited. For example, in other embodiments, a processor forming part of the toothbrush can carry out the steps carried out by processor 169 in the embodiments discussed herein.

In a first operation, the programmable processor 169 receives oral characteristic data indicative of an oral characteristic of a user (operation 202). An "oral characteristic" can refer to any quality or trait of or affecting a user's oral cavity. Such oral characteristics can include, but are not limited to, an oral sensitivity (e.g., of the teeth, gums, or another part of the mouth), an abnormality of the dentiture (e.g., a missing tooth, a crooked tooth, an extra tooth), the presence or absence of wisdom teeth, a receding gum line, a tooth structure that traps (or tends to trap) plaque, plaque present at a first portion of the dentiture, a cavity, an erosion of one or more teeth, an oral injury or procedure (e.g., a recent tooth removal), a type of bacteria present in the mouth (including excessive bacteria or a harmful bacteria), and any indicator (physical, chemical, or otherwise) of a disease or malady (e.g., oral cancer).

"Oral characteristic data" can refer to any type of information indicative of an oral characteristic of a user, including information extracted or derived from other information or data indicative of an oral characteristic, regardless of the form of the extracted information, and combinations thereof. The oral characteristic data may be in the form of mathematical data, analog data, and/or digital data. For example, the oral characteristic data can be data obtained from a user interface, data obtained from a sensor, or data derived from one or both of the foregoing.

In certain embodiments, the oral characteristic is input at a user interface of a data processing unit. The data processing unit then generates oral characteristic data indicative of the chosen oral characteristic, which is then transmitted to a programmable processor. The receipt of oral characteristic data from a user interface is discussed in more detail below with respect to FIGS. 3A and 3B.

In certain other embodiments, the oral characteristic data can be generated using a sensor operably coupled to a programmable processor. The sensor can be any device or subsystem configured to detect an oral characteristic (or evidence of an oral characteristic) and generate oral characteristic data. For example, the sensor can be an accelerometer, a gyroscope, a magnetometer, a pressure sensor, an optical imaging subsystem, and an oral malady detection subsystem. In some embodiments, the sensor can form part of the toothbrush (e.g., an accelerometer located on a head of the toothbrush to detect motion of the brush head). In other embodiments, the sensor can form part of a separate device, such as a data processing unit (e.g., a camera on the phone that can carry out optical imaging to detect a receding gum line or a cavity).

Figure 8:
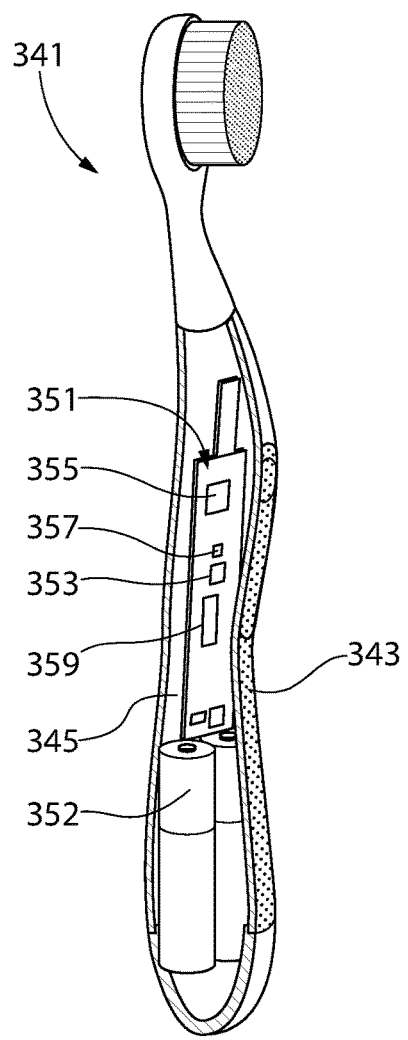
FIG. 8 illustrates a partial sectional view of a toothbrush having electronic circuitry for collecting brushing session data according to an embodiment of the invention.
Figure 9:
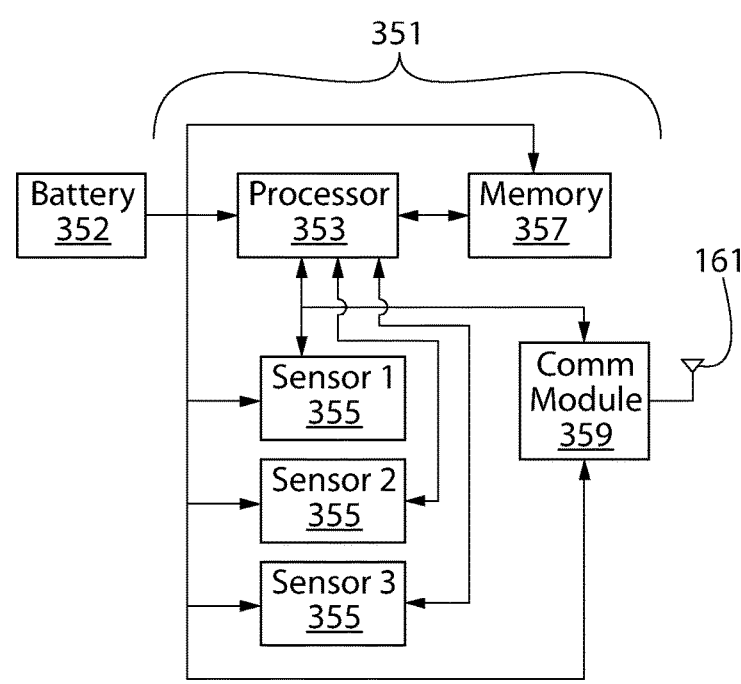
FIG. 9 is a schematic of the electronic circuitry of the toothbrush of FIG. 8.
Figure 10:
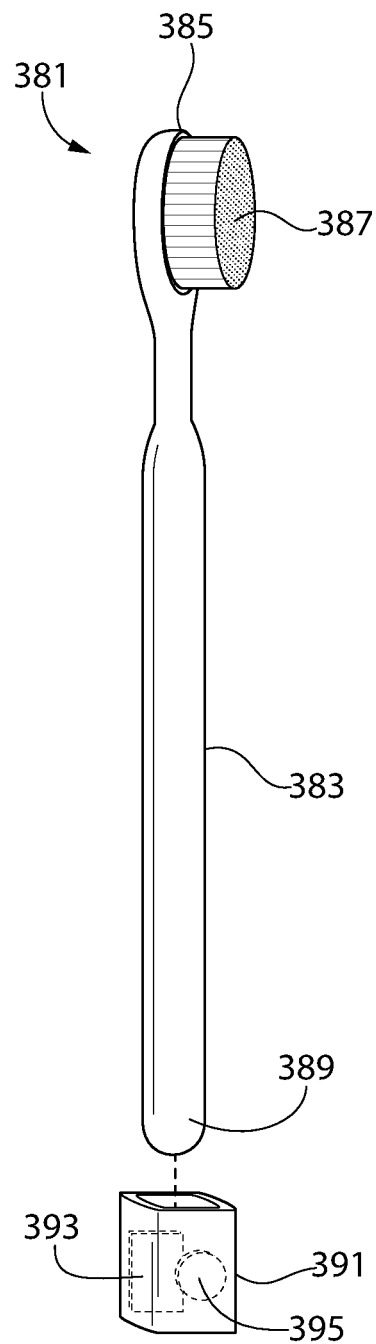
FIG. 10 illustrates a toothbrush dongle having electronic circuitry for collecting brushing session data according to an embodiment of the invention.

For example, FIG. 8-10 discuss a toothbrush 351 having electronic circuitry for collecting brushing session data. As is discussed in more detail below, the one or more sensors 355 can be, for example, an accelerometer, gyroscope, magnetometer, or pressure sensor. The brushing session data that is detected by the sensor may include data regarding, for example, a toothbrush's position, motion, acceleration, frequency, and/or pressure against the surface of the teeth. The brushing session data can be indicative of numerous issues, such as avoidance of a portion of the dentiture (indicating, for example, an oral sensitivity), excessive brushing (indicating for example, a tooth structure that traps plaque or food), a unique brushing motion (indicating for example, a hidden, crooked, or missing tooth), or the presence or absence of a chemical (indicating, for example, a high bacteria content in the user's mouth).

In one embodiment, the sensors generate brushing session data indicative of brushing motion, location, and/or pressure. This data is then used to determine that the user is avoiding brushing a certain portion of the dentiture, or using only minimal pressure. This avoidance can indicate an oral sensitivity at or adjacent to that portion of the dentiture. To confirm, a user interface, upon receiving such brushing session data, can provide the user a question such as "Do you have oral sensitivity in the region indicated below," with an image of the user's dentiture and an indication of the avoided portion.

In another embodiment, excessive brushing of a certain portion of the dentiture can indicate a tooth structure that traps plaque or food, such as molars that tend to cause cavities, or a crooked or hidden tooth (i.e., a tooth behind another tooth and difficult to access). If the brushing session data indicates excessive brushing of a certain portion, the user interface can query the user to determine or confirm the reason.

In another embodiment, the sensor can determine that the user is using a unique brushing motion for a portion of the dentiture. The user interface can query the user as to whether this motion is being carried out to clean a unique oral characteristic, such as a hidden, crooked, or missing tooth, a gap in the teeth, or another unique property of the user's dentiture. For example, a user may use a unique, vertical brushing motion to brush a hidden tooth, or may not move the brush as deeply into the oral cavity because of missing wisdom teeth or molars.

In another embodiment, the sensor can be an oral malady detection subsystem. For example, a subsystem could use chemistry to determine the presence of an abnormal property, such as high bacteria content in a user's saliva. Other properties could be indicative of a cavity, plaque, bad breath, or cancer, or another oral disease or malady.

In another embodiment, the sensor can be an optical imaging subsystem that can identify a unique oral characteristic, such as receding gum line in a certain area, a missing or crooked tooth, an extra tooth, or a cavity. For example, an imaging system can distinguish the white of a tooth and the pink of gums to determine a length of a gum line and whether there is an abnormality. An imaging system could similarly be used to identify a developing cavity and thus an area that warranted more brushing attention, or tooth erosion from tooth grinding that can cause sensitivity. The subsystem can utilize the technology of a data processing unit providing a user interface (such as the camera and processor of a smartphone), or another, separate device.

It is noted that, in some of the embodiments discussed above, the user is queried to confirm that the suspected oral characteristic is present. In other embodiments, this step can be omitted. Further, the sensor(s) can determine a suspected oral characteristic based on data from one brushing session or from a plurality of brushing sessions. Further, the above characteristics can alternatively be determined by querying the user, rather than by using brushing session data provided by sensors.

In a further operation, a suggested brushing routine is determined based at least in part on the oral characteristic data (operation 204). The suggested brushing routine can be any one or more steps or instructions for brushing teeth. The determination of the suggested brushing routine may be achieved in any number of ways. In certain embodiments, the suggested brushing routine may be determined by presenting the user with a list of potential brushing routines that accord with the determined oral characteristic, and having the user select the suggested brushing routine from among the list of potential brushing routines. In certain embodiments, the suggested brushing routine may be determined by adjusting a standardized brushing routine based on the oral characteristic data, or by adjusting a time based on the oral characteristic data, as described below. In certain embodiments, the suggested brushing routine may be determined by selecting a predetermined brushing routine based on the oral characteristic data and then adjusting the predetermined brushing routine based on a user brushing history. In such embodiments, the user brushing history may be based upon brushing session data collected from previous brushing sessions of the user. Such brushing session data may be based upon brush stroke, brushing aggressiveness, or upon any other measure of brushing effectiveness. In addition, such brushing session data may be saved in the memory 171 of the data processing unit 105 or in a memory of the server 107. In still other embodiments, one or more of the aforementioned processes for determining the suggested brushing routine may be used in combination.

In one embodiment, the suggested brushing routine is determined by adjusting an optimum brushing time based on the oral characteristic data to determine the brushing time for the suggested brushing routine. In this embodiment, the optimum brushing time is predetermined from a standardized brushing routine. The standardized brushing routine may be an industry standard brushing routine in which the optimum brushing time is 2 minutes. This process can begin with the oral characteristic data being received by the data processing unit 105. Next, the data processing unit 105 determines an offset time based on the oral characteristic data. For example, if a certain portion of the denture is sensitive, then the offset time for this portion may be a negative number. Following the offset time determination, the target brushing time for the brushing routine is calculated. As part of this step, the programmable processor 169 of the data processing unit 105 calculates the target brushing time by retrieving an optimum time which is stored in the memory 171 and adding the determined offset time to the optimum time. The determined target brushing time can then be displayed, and the user can be instructed to begin the suggested brushing routine. In certain embodiments, the processor 169 of the data processing unit 105 may provide other specific instructions for the brushing routine, such as the order for brushing different sections of the user's denture, the length of time to brush each section, which section to start with, the brushing motions to use for each section, and the like. When the brushing time has expired, the programmable processor 169 of the data processing unit 105 can instruct the user that the brushing routine is at an end.

In the exemplified embodiment, after determining the suggested brushing routine, there can be a determination of a brushing evaluation based on the oral characteristic data (operation 206). As will be discussed in further detail below, the oral care system 101 can be configured to perform a brushing evaluation of a brushing session of a user. The brushing evaluation can be any assessment of the effectiveness of one or more brushing sessions. For example, as discussed in FIGS. 8-10, the toothbrush 103 can include sensors, and data derived from the sensors can be used to determine the motion, location, and/or pressure of the toothbrush. From this determination, the system 101 can determine how well the user brushed his or her teeth. In the exemplified embodiment, the evaluation is based in part on the oral characteristic data. Thus, for example, while a brushing evaluation would typically provide a negative evaluation when a certain portion of the denture was only brushed for ten seconds or with light pressure, the brushing evaluation according to the invention need not be negative if the user indicated that this was a sensitive portion of the denture. Accordingly, the user is not penalized in his brushing evaluation for dedicating less brushing time (or applying softer pressure) to a sensitive area of his denture. Thus, in certain embodiments, the determination of the brushing evaluation is based on both oral characteristic data and brushing data from a brushing session, the brushing data being derived from a sensor forming part of the toothbrush. Further, the brushing evaluation can be based on a comparison of the brushing data from the brushing session and the suggested brushing routine. For example, the brushing evaluation can be based on how well the user followed the suggested brushing routine.

The oral characteristic data can impact an evaluation of an individual brushing session, and can also impact an evaluation of a plurality of brushing sessions. Thus, while a recent wisdom tooth removal surgery will justify less and more gentle brushing of the molars for a few weeks, there is an expectation that eventually the brushing time and intensity will increase. A cumulative evaluation can reflect this. The cumulative evaluation will not penalize the user for gentle brushing immediately after the surgery, but will also expect more normal brushing to return eventually.

In the exemplified method 200, the oral characteristic data is used to both determine a suggested brushing routine and determine a brushing evaluation. It is noted, however, that in other embodiments the oral characteristic data can be used to determine a suggested brushing routine but not to determine a brushing evaluation, or to determine a brushing evaluation but not to determine a suggested brushing routine.

The following are some examples of determined oral characteristics, and resulting brushing routines and/or evaluations. In one example, if there is a determination that a portion of the denture is sensitive, a suggested routine can recommend less time brushing the sensitive portion. Further, an evaluation can expect less time brushing this portion of the denture.

In another example, if there is a determination of an oral characteristic that warrants excessive brushing of a portion of the denture (e.g., a tooth structure that traps plaque or food, such as molars that tend to cause cavities, or a crooked or hidden tooth), a suggested brushing routine can dedicate additional time to this portion of the denture. Further, an evaluation can expect additional time brushing this portion of the denture.

In another example, if there is a determination that a unique oral characteristic warrants a unique brushing motion (e.g., a hidden, crooked, or missing tooth), a suggested routine can adjust its instructions to allow adequate brushing of these unique oral characteristics, including recommending the unique brushing motion. Further, an evaluation can allow for or expect these unique brushing motions.

Figure 3A:
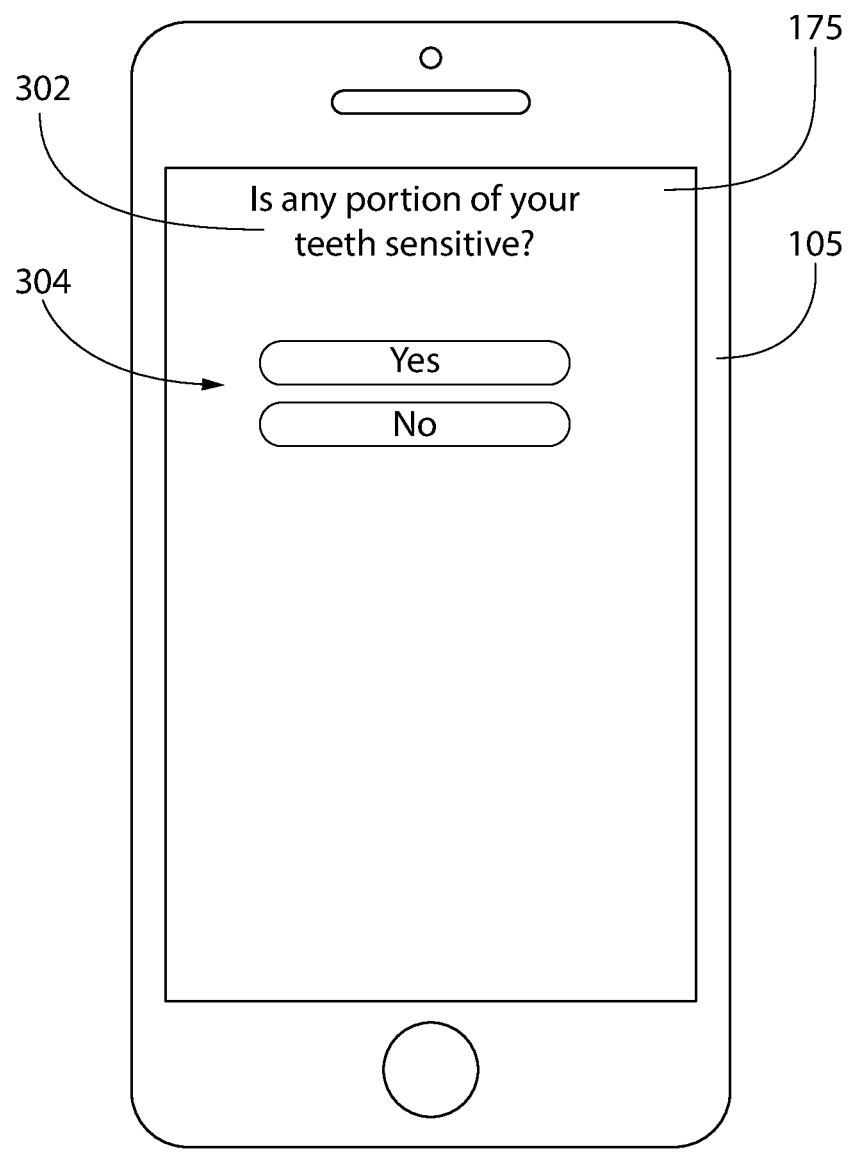
FIG. 3A illustrates a data processing unit having a user interface providing a question and answer options regarding an oral characteristic according to an embodiment of the invention.
Figure 3B:
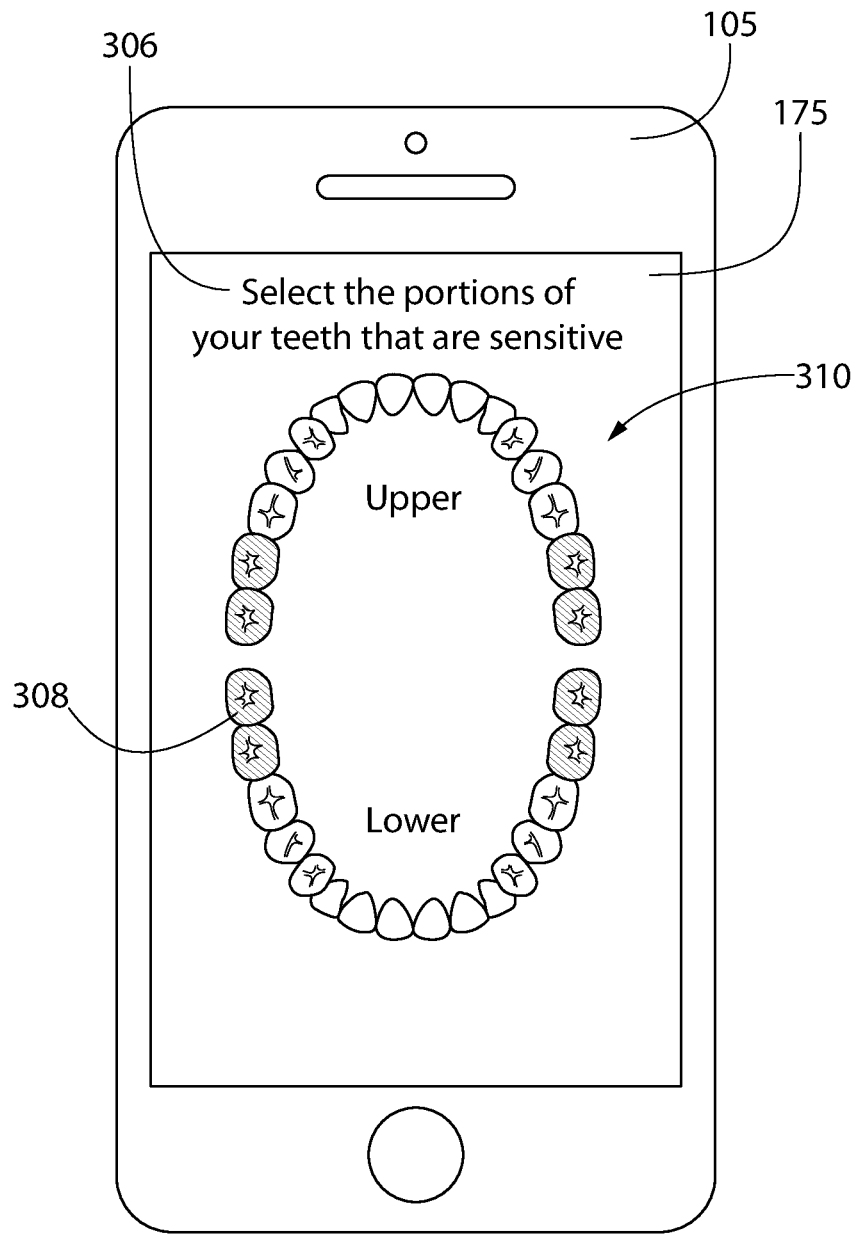
FIG. 3B illustrates a data processing unit having a user interface providing a statement and response options regarding an oral characteristic according to an embodiment of the invention.

FIGS. 3A and 3B illustrates a data processing unit 105 having a user interface 175 for determining an oral characteristic according to one embodiment. In FIG. 3A, the user interface 175 provides a question 302 and answer options 304 regarding an oral characteristic. Here, the user inputs the oral characteristic through a user interface 175 that is a touch-sensitive screen, though alternative types of user interfaces can be utilized. In this embodiment, the user indicates that he has sensitive teeth. In FIG. 3B, a statement 30 is provided that is responsive to the answer 304. The statement 306 asks the user which portion of the user's teeth are sensitive. A visualization of the denture 310 is provided. Here, the user provides a response 308 indicating that the back molars are sensitive. The questions, answers, statements, and responses shown are merely exemplary in nature, and any oral characteristics can be the subject of a question, answer, statement, or response on a user interface for the purposes of receiving oral characteristic data. In other embodiments, a user can type an oral characteristic and be provided with options that corresponded with the typed oral characteristic. In other embodiments, a series of questions, statements, or topics can be provided to the user by the user interface. For example, the user interface can be used to determine several oral characteristics of the user and in varying degrees of detail.

Figure 4:
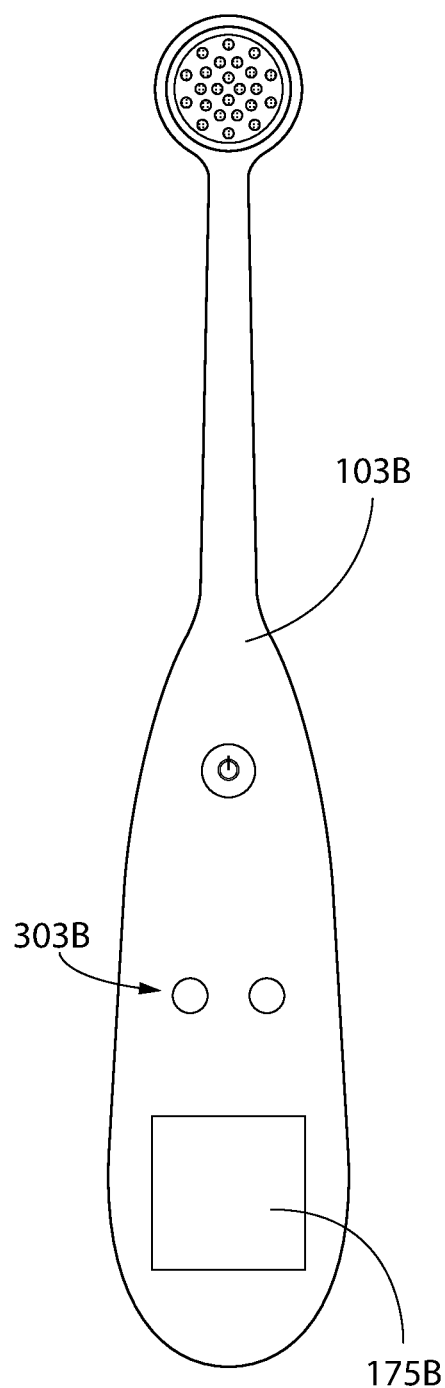
FIG. 4 illustrates a toothbrush comprising a user interface according to another embodiment of the invention.

FIG. 4 illustrates a toothbrush 103B comprising a user interface 175B according to another embodiment of the invention. In this embodiment, the toothbrush 103B comprises a user interface 175B and a programmable processor (not shown) similar to programmable processor 169 that forms part of data processing unit 105. The user interface 175B comprises buttons 303B for use in providing or selecting an oral characteristic. The exemplified user interface 175B further comprises a display. The display can provide information similar to the information displayed on the touch-sensitive display 175. For example, the display can provide information regarding a suggested brushing routine, or brushing evaluation information. In other embodiments, the display can have more limited functionality. In other embodiments, the display can be omitted. In this case, the user can indicate his oral characteristic using the buttons (or another user interface), but the determined routine or evaluation can appear elsewhere, such as on a separate data processing unit. Further, the toothbrush 103B can be any type of toothbrush, including a manual toothbrush or an electric toothbrush having an electrically-powered vibratory element.

Figure 5:
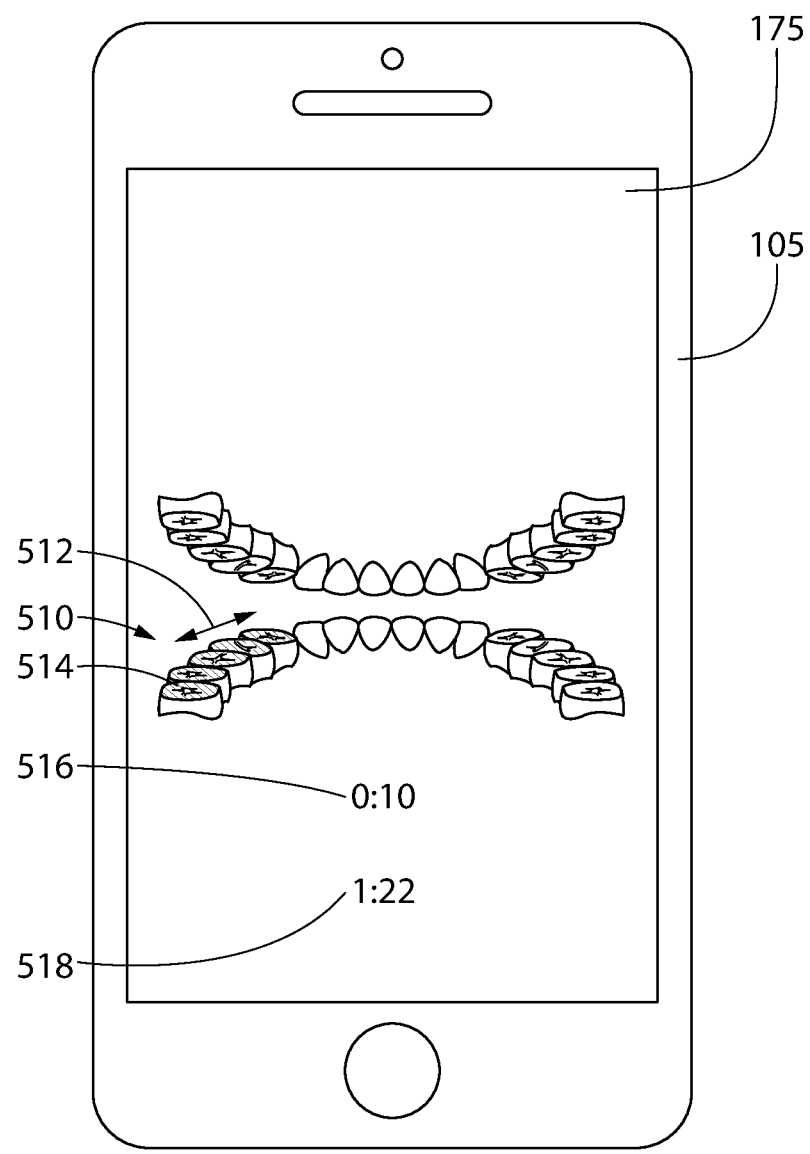
FIG. 5 illustrates a data processing unit having a user interface that provides brushing instructions for a brushing routine according to an embodiment of the invention.

FIG. 5 illustrates a data processing unit 105 having a user interface 175 that provides brushing instructions 510 for a brushing routine according to one embodiment, the instructions 510 being based in part on the oral characteristic received. In this embodiment, the brushing instructions 510 comprise real-time directions for a user to follow during a brushing session. The instructions 510 comprise an indication 514 of a region of the dentiture to brush, an indication 512 of a brushing motion, and an indication 516 of a time remaining for brushing the specified region. In this embodiment, the user interface 175 also provides an indication 518 of the total brushing time remaining in the suggested brushing routine. In this embodiment, different screens may show different instructions as the user progresses through the different stages of the brushing routine, thus coaching the user on which regions to brush, which brushing motions to use, and for how long. In other embodiments, certain indications or instructions can be omitted. Also, other indications or instructions can be added, such as an indication of whether to apply greater or lesser pressure or brushing intensity. The instructions (such as motion, region, and time) can be based at least in part on the oral characteristic of the user. Thus, for example, if a first portion of the user's dentiture was sensitive (or was adjacent to a receding gum line, or included a sensitive eroded tooth), the routine could reflect this by decreasing the brushing time suggested for this first portion of the dentiture, and/or by changing the brushing motions suggested for this portion of the dentiture. Further, if an oral characteristic is a tooth structure that traps plaque, the routine can reflect this by increasing the brushing time for the portion of the dentiture having this tooth structure, and/or by changing the brushing motions suggested for this portion of the dentiture. An evaluation of the brushing session can also reflect such adjusted expectations.

The suggested brushing routine can be determined by adjusting a preexisting brushing routine, the adjustment based at least in part on the oral characteristic data. In other embodiments, the suggested brushing routine need not rely on a preexisting brushing routine. The brushing routine of the exemplified embodiment is provided in real-time, so that the user can follow a succession of instructions provided on the user interface 175. In other embodiments, the entire routine can be provided at once, and can be provided by other means, such as an email or a text message.

Figure 6:
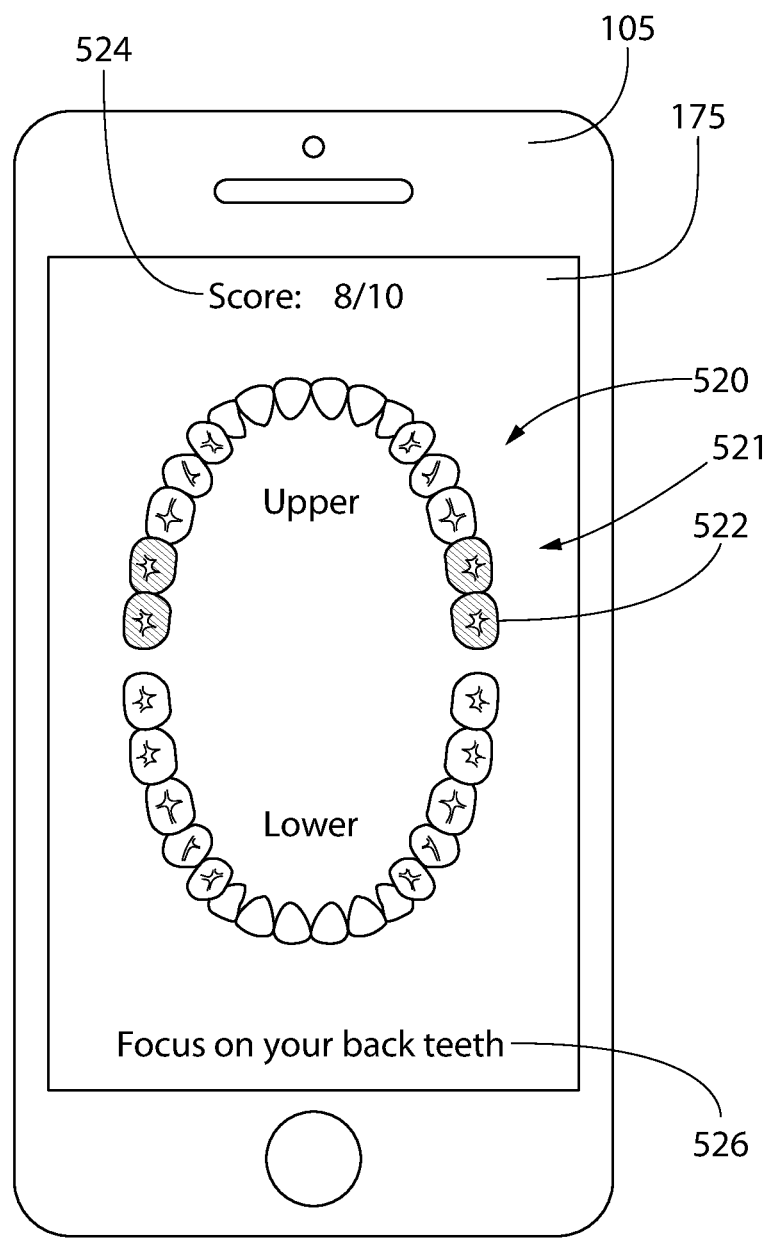
FIG. 6 illustrates a data processing unit having a user interface that provides an evaluation of a brushing session of a user according to an embodiment of the invention.

FIG. 6 illustrates a data processing unit 105 having a user interface 175 that provides an evaluation 520 of a brushing session of a user according to an embodiment of the invention. In this embodiment, the evaluation 520 comprises a visualization 521 of the user's dentiture. The dentiture can be divided into different regions, each of which the user is expected to brush during the brushing session. Brushing session data may be collected and processed according to the different regions of the dentiture. The collection of such brushing session data is described in more detail below with respect to FIGS. 8-10.

In the exemplified embodiment, the visualization 521 includes an indication 522 of a region of the dentiture not properly brushed. The evaluation 520 further comprises a recommendation 526 that provides the user advice on how to improve his or her brushing. The evaluation 520 also includes a performance metric 524 that indicates how well the user performed in brushing his or her teeth during the brushing session. In other embodiments, other metrics or visualizations can be used to indicate brushing performance, such as a percentage, or a number of stars (for example, three stars out of five). Further, as discussed above, in other embodiments, the evaluation can be a cumulative evaluation based on a plurality of brushing sessions and oral characteristic data from those brushing sessions.

Figure 7:
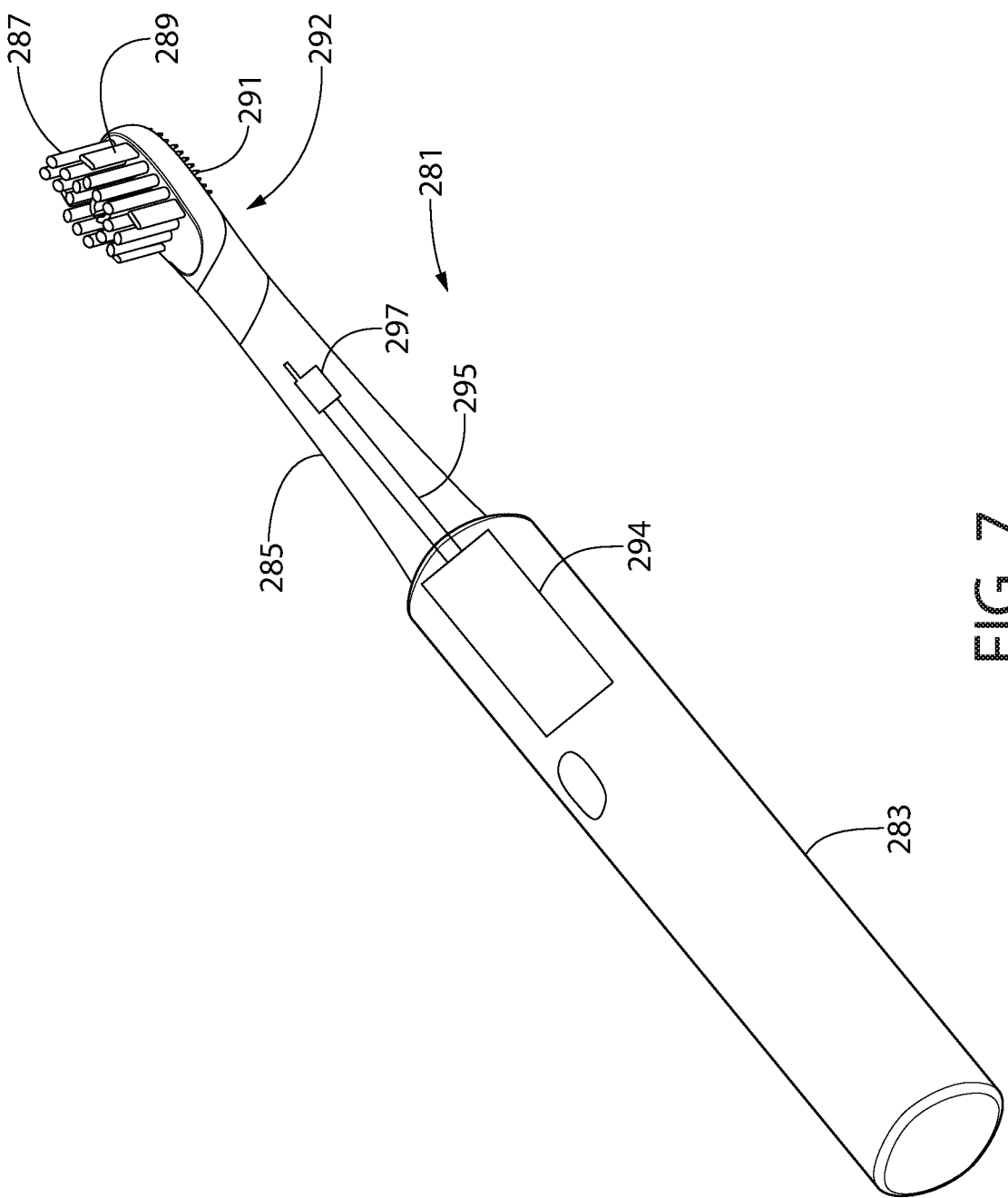
FIG. 7 illustrates an electronic toothbrush according to an embodiment of the invention.

FIG. 7 illustrates an electronic toothbrush 281 according to an embodiment of the invention. The electric toothbrush 281 includes a handle 283 and a refill head 285. In certain embodiments, the handle 283 and the refill head 285 are removably coupled to each other. In certain embodiments of electric toothbrushes, the control circuit 165 of the data processing unit 105 may reside at least partially within the handle 283. Alternatively, the handle 283 may include a separate toothbrush control circuit which controls the electric toothbrush and communicates with the data processing unit 105.

In this embodiment, the refill head 285 includes a bristle field 287 which includes at least one elastomeric element 289 and a tongue cleaner 291 on the back side 292 of the refill head 285. Also in this embodiment, shown schematically, the handle includes a motor 294 operably coupled to a shaft 295, with an eccentric mass 297 positioned at the distal end of the shaft 295. In combination, the motor 294, the shaft 295, and the eccentric mass 297 form an electrically-powered vibratory element.

FIG. 8 illustrates a partial sectional view of a toothbrush 351 having electronic circuitry for collecting brushing session data according to an embodiment of the invention. The handle 343 of the toothbrush 341 forms a housing for containing electronic circuitry 351 for collecting brushing session data. The handle 343 is a hollow structure in which a cavity 345 is formed. The electronic circuitry 351, which includes a power source 352, is located within the cavity. The electronic circuitry 351 may be used to collect and analyze brushing session data from which an evaluation of the brushing session may be made. In certain embodiments, the evaluation of the brushing session may be based at least in part upon the oral characteristic data. As discussed above, the brushing session data can also be used to determine an oral characteristic.

FIG. 9 is a schematic of the electronic circuitry 351 of the toothbrush 341 of FIG. 8. The electronic circuitry 351 includes a processor 353 communicably coupled to sensors 355, a memory 357, and a communication module 359. The number of sensors 355 included as part of the electronic circuitry 351 depends upon the type of brushing session data to be detected and the functionality of each type of sensor employed. The brushing session data that is detected and collected may include data regarding position, motion, acceleration, frequency, and pressure against the surface of the teeth. Other types of brushing session data associated with a brushing session may also be detected and collected, and those listed herein are not to be limiting of the invention unless otherwise indicated in the claims. In certain embodiments, only one sensor 355 may be included as part of the electronic circuitry 351, and in other embodiments, two or more sensors 355 may be included. By way of example, the at least one sensor 355 may be any one or more of the following: a 3-axis accelerometer, a gyroscope, a magnetometer, a pressure sensor, among other types of sensors. In general, each sensor 355 included as part of the electronic circuitry 351 generates at least part of the brushing session data. For purposes of the present disclosure, the term "brushing session data" is any type of information which may be extracted or derived from a sensor or sensor signal, regardless of the form of the extracted information, for determining information about a brushing session of a user. By way of example, brushing session data may be in the form of mathematical data (such as a formula which mathematically represents at least part of the sensor signal), analog data (such as the waveform of the sensor signal), and/or digital data (such as a representation of at least part of the sensor signal in a digital format). In certain embodiments, the processor 353 and the memory 357 may be omitted from the electronic circuitry 351 of the toothbrush 341. In such embodiments, the sensors 355 may communicate brushing session data directly to the communication module for transmission.

The memory 357 may be any appropriate type of memory or storage which enables the processor 353 to perform the desired programming, such as volatile and/or non-volatile random access memory, or any other type of storage. The particular type of storage used for the memory 357 is not to be limiting of the invention. The communication module 359 in the exemplary embodiment includes an antenna 361 to enable wireless communication. The communication module 359 may be configured and/or programmed to communicate using a wireless technology standard such as Wi-Fi, Bluetooth®, and the like, or it may communicate using any type of proprietary wireless transmission protocol. In certain embodiments, the communication module 359 may include a port to enable communications using wires and wired protocols, such as USB and the like. The particular mode of communication used by the communication module is not limiting of the invention unless specifically set forth in a claim.

FIG. 10 illustrates a toothbrush dongle 391 for collecting brushing session data. Generally, the toothbrush 381 includes a handle 383 and a head 385 to which a plurality of teeth cleaning elements 387 are affixed. The dongle 391 may be removably affixed to the proximal end 389 of the handle 383. The dongle 391 comprises a housing for containing electronic circuitry 393 and an associated a power source 395, which may be similar to that described above in connection with FIG. 9.

The brushing session data which is detected and collected by the toothbrush embodiments shown in FIGS. 8-10 may include a side-to-side linear brush stroke motion, an up and down linear brush stroke motion, a circular brush stroke motion, a flicking brush stroke motion, a brush stroke rate, and a pressure of the head of the toothbrush on the teeth, amongst others. During use, the brushing session data is generated during at least a portion of the brushing session. The brushing session data may be used to evaluate the brushing session by calculating one or more performance metrics, and the performance metric may represent brushing efficacy during one or more portions of the brushing session. The performance metric may express the efficacy of a brushing session, or even for portions of a brushing session, as a single number, and stored in the memory 171 of the data processing unit 105 for later use. In certain embodiments, the data processing device 105 may transmit the calculated performance metrics to the server 107 for storage and or additional analysis.

In certain embodiments, the performance metrics which are stored in the memory 171 of the data processing unit 105 or on the server 107 may be used during future brushing sessions to aid in determining what brushing routine to suggest to the user. For example, performance metrics may be used in combination with the oral characteristic data to help determine the target brushing time for a brushing routine. Also, in embodiments in which performance metrics are stored, the performance metrics may be analyzed by machine learning processes, and the machine learning may be used to enhance future brushing routines.

The embodiments above discuss using oral characteristic data to determine a brushing routine and/or evaluation. Note that the routine or evaluation can also be based on other factors, such as predetermined brushing standards (e.g., two minutes of total brushing time and recommended brushing motions for different portions of the denture), physical characteristics of the brush being used by the user (e.g., soft or hard bristles, or the shape and/or size of the toothbrush head), and the user's brushing goals for a given brushing session (e.g., a quick fresh as opposed to a deep clean).

In certain embodiments, the user can use the data processing unit while brushing his teeth to receive real-time instructions for the brushing routine. In such instances, the brush and the data processing unit can be in communication. In other instances, the brush can be used without the data processing unit, and/or without a processor immediately determining a brushing routine or evaluation. For example, the brush can store brushing session data locally in the toothbrush, and this data can be retrieved at a later time. This stored brushing session data can subsequently be used for providing a brushing evaluation or suggested brushing routine, and/or for suggesting potential oral characteristics.

The disclosed embodiments provide several advantages. For example, the system can provide a brushing routine that takes into consideration the unique oral characteristics of the user. Thus, the brushing routine provided can reflect oral characteristics of the user, rather than providing the same standard routine regardless of the user. Further, the system can provide a brushing evaluation that takes into consideration the oral characteristics of the user. Thus, an evaluation can be based on the user's unique oral characteristics, rather than judging the brushing session based on an unadaptable, one-size-fits-all standard. For example, if a user has a first portion of the denture that is sensitive and is adjacent to a receding gum line, the suggested routine can dedicate less brushing time to this first portion, and can avoid penalizing the user for spending less than a standard time brushing this portion. Alternatively, if a user still has his or her wisdom teeth, the suggested routine can dedicate more time to the back molars, and the evaluation can expect that the user's brushing motion reaches further back in the oral cavity when brushing the back molars.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention or inventions have been described with respect to specific examples, those skilled in the art will appreciate that there are numerous variations and permutations of the above described invention(s). It is to be understood that other embodiments may be utilized and structural and functional modifications may be made without departing from the scope of the present invention(s). Thus, the spirit and scope should be construed broadly as set forth in the appended claims.

What is claimed is:

1. An oral care system comprising:
a toothbrush comprising a sensor configured to generate brushing data during a brushing session of a user, the sensor comprising at least one of an accelerometer, a gyroscope, or a magnetometer, and the brushing data indicative of at least one of a motion, a position, or a frequency the toothbrush during the brushing session;
a user interface configured to receive oral characteristic data from the user;
a programmable processor coupled to the user interface, the programmable processor configured to:
receive the brushing data from the sensor;
receive, from the user interface, the oral characteristic data indicative of an oral characteristic of the user, the oral characteristic being a physical, chemical, or biological trait of an oral cavity of the user; and
determine for the user, based at least in part on the oral characteristic data and the brushing data from the sensor, at least one of a suggested brushing routine and a brushing evaluation for a brushing session;
wherein the oral characteristic is present in or adjacent to a first portion of the dentition; and
wherein the brushing evaluation or brushing routine is based on or includes at least one of:
an altered target brushing time for the first portion of the dentiture; and
a modified brushing motion expectation for the first portion of the dentiture.

2. The system as in claim 1 wherein the programmable processor is configured to both determine the suggested brushing routine and determine the brushing evaluation for the brushing session.

3. The system as in claim 1 wherein the receiving of the oral characteristic data comprises:
presenting to the user, by the user interface, one or more questions or statements concerning at least one oral characteristic of the user; and
receiving the oral characteristic data as answers or responses to the one or more questions or statements, the answers or responses being selected by the user using the user interface.

4. The system as in claim 1 wherein:
the oral characteristic is an abnormality of the dentiture; and
the oral characteristic data generated by the sensor is indicative of a brushing motion associated with the abnormality of the dentiture.

5. The system as in claim 1 wherein the oral characteristic pertains to at least one of an oral sensitivity, an abnormality of the dentiture, a missing tooth, a crooked tooth, an extra tooth, a receding gum line, a tooth structure that traps plaque, plaque present at a first portion of the dentiture, a cavity, an erosion of one or more teeth, an oral injury or procedure, a type of bacteria present in the mouth, and an oral disease or malady.

6. The system as in claim 1 wherein:
the oral characteristic is an oral sensitivity, a receding gum line, or an erosion of one or more teeth; and
the brushing evaluation or brushing routine is based on or includes a decreased target brushing time for the first portion of the dentiture.

7. The system as in claim 1 wherein:
the oral characteristic is a tooth structure that traps plaque at a first portion of the dentiture of the user; and
the brushing evaluation or brushing routine is based on or includes an increased target brushing time for the first portion of the dentiture.

8. The system as in claim 1 wherein a user interface is configured to display brushing instructions based on the suggested brushing routine, the brushing instructions comprising real-time directions for a user to follow during a brushing session.

9. The system as in claim 1 further comprising a data processing unit, the data processing unit comprising the programmable processor.

10. An oral care method comprising:
generating, via a sensor, brushing data during a brushing session of a user, the sensor comprising at least one of an accelerometer, a gyroscope, a magnetometer, or a pressure sensor, and the brushing data indicative of at least one of a motion, a position, a frequency, or a pressure of the toothbrush during the brushing session;
receiving, via a user interface, oral characteristic data indicative of an oral characteristic of the user, the oral characteristic being a physical, chemical, or biological trait of an oral cavity of the user; and
determining for the user, by a programmable processor, based at least in part on the oral characteristic data and the brushing data, at least one of a suggested brushing routine and a brushing evaluation for a brushing session;
wherein the oral characteristic is present in or adjacent to a first portion of the dentiture; and
wherein the brushing evaluation or brushing routine is based on or includes at least one of:
an altered target brushing time for the first portion of the dentiture; and
a modified brushing motion expectation for the first portion of the dentiture.

11. The method as in claim 10 wherein the receiving of the oral characteristic data comprises:
presenting to the user, via the user interface, one or more questions or statements concerning at least one oral characteristic of the user; and
receiving the oral characteristic data as answers or responses to the one or more questions or statements, the answers or responses being selected by the user using the user interface.

12. The method as in claim 10 wherein the oral characteristic pertains to at least one of an oral sensitivity, an abnormality of the dentiture, a missing tooth, a crooked tooth, an extra tooth, a receding gum line, a tooth structure that traps plaque, plaque present at a first portion of the dentiture, a cavity, an erosion of one or more teeth, an oral injury or procedure, a type of bacteria present in the mouth, and an oral disease or malady.

13. The method as in claim 10 wherein the user interface displays brushing instructions based on the suggested brushing routine, the brushing instructions comprising real-time directions for a user to follow during a brushing session.

14. An oral care system comprising:
a toothbrush comprising a sensor configured to generate brushing data during a brushing session of a user, the sensor comprising at least one of an accelerometer, a gyroscope, a magnetometer, or a pressure sensor, and the brushing data indicative of at least one of a motion, a position, a frequency, or a pressure of the toothbrush during the brushing session; and a data processing unit comprising:
- a user interface configured to receive an oral characteristic from the user; and
- a programmable processor configured to:
  - receive oral characteristic data indicative of the oral characteristic received by the user interface, the oral characteristic being a physical, chemical, or biological trait of an oral cavity of the user;
  - determine for the user, based at least in part on the oral characteristic data and the brushing data from the sensor, a suggested brushing routine; and
  - determine for the user, based at least in part on the oral characteristic data and the brushing data from the sensor, a brushing evaluation for a brushing session;

wherein the oral characteristic is present in or adjacent to a first portion of the dentiture; and wherein the brushing evaluation or brushing routine is based on or includes at least one of:
- an altered target brushing time for the first portion of the dentiture; and
- a modified brushing motion expectation for the first portion of the dentiture.

15. The system as in claim 14 wherein the receiving of the oral characteristic data comprises:
- presenting to a user, by the user interface, one or more questions or statements concerning at least one oral characteristic of the user; and
- receiving the oral characteristic data as answers or responses to the one or more questions or statements, the answers or responses being selected by the user using the user interface.

* * * * *